No. 777,078. PATENTED DEC. 13, 1904.
C. E. CLOUSE.
CORN HARVESTING MACHINE.
APPLICATION FILED MAR. 17, 1904.
NO MODEL. 3 SHEETS—SHEET 1.
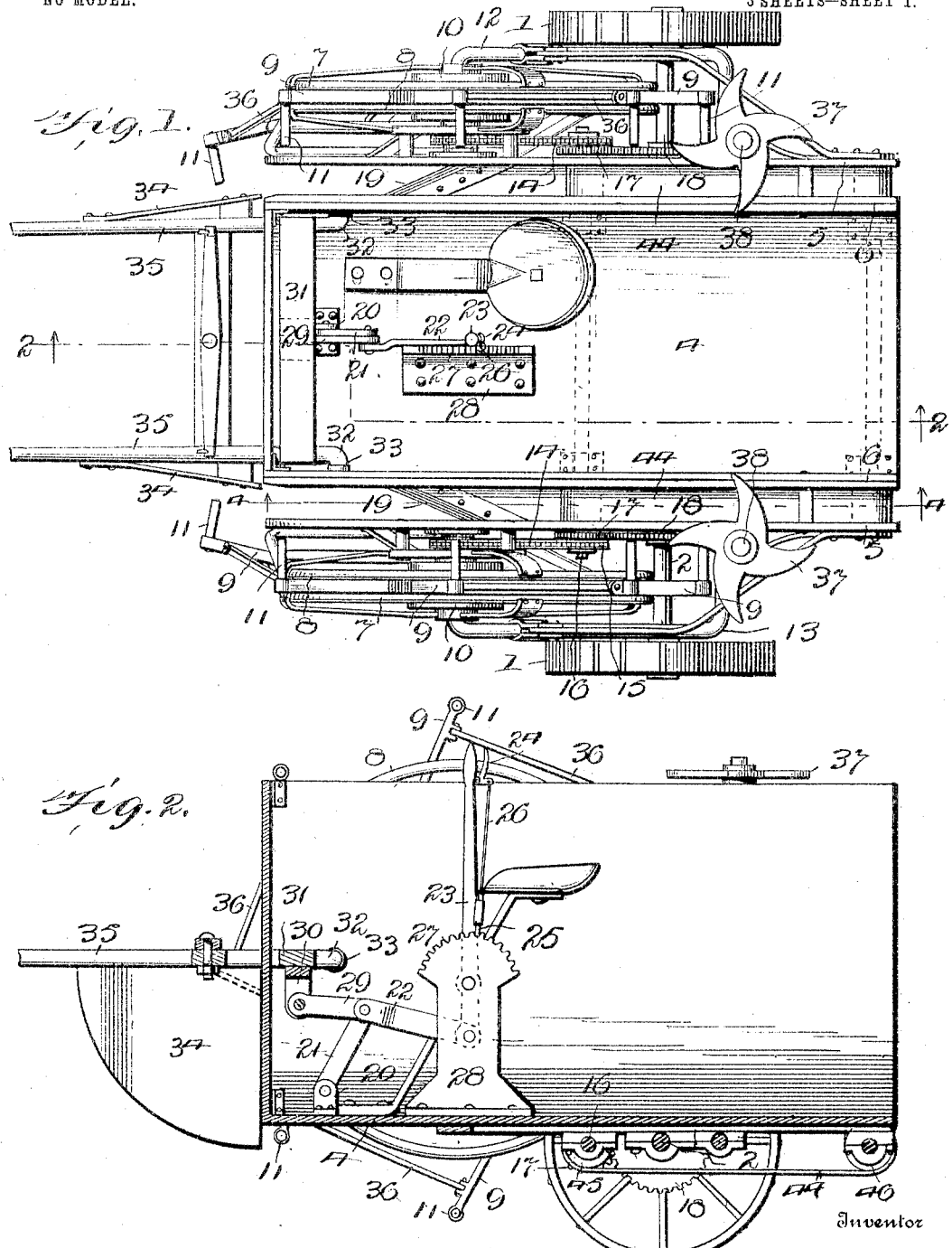
Witnesses
H. C. Barry
C. E. Richter
Inventor
Charles E. Clouse.
By W. J. Fitzgerald
Attorney No. 777,078. PATENTED DEC. 13, 1904.
C. E. CLOUSE.
CORN HARVESTING MACHINE.
APPLICATION FILED MAR. 17, 1904.
NO MODEL. 3 SHEETS—SHEET 2.

Witnesses
Inventor
Charles E. Clouse.
By
Attorneys

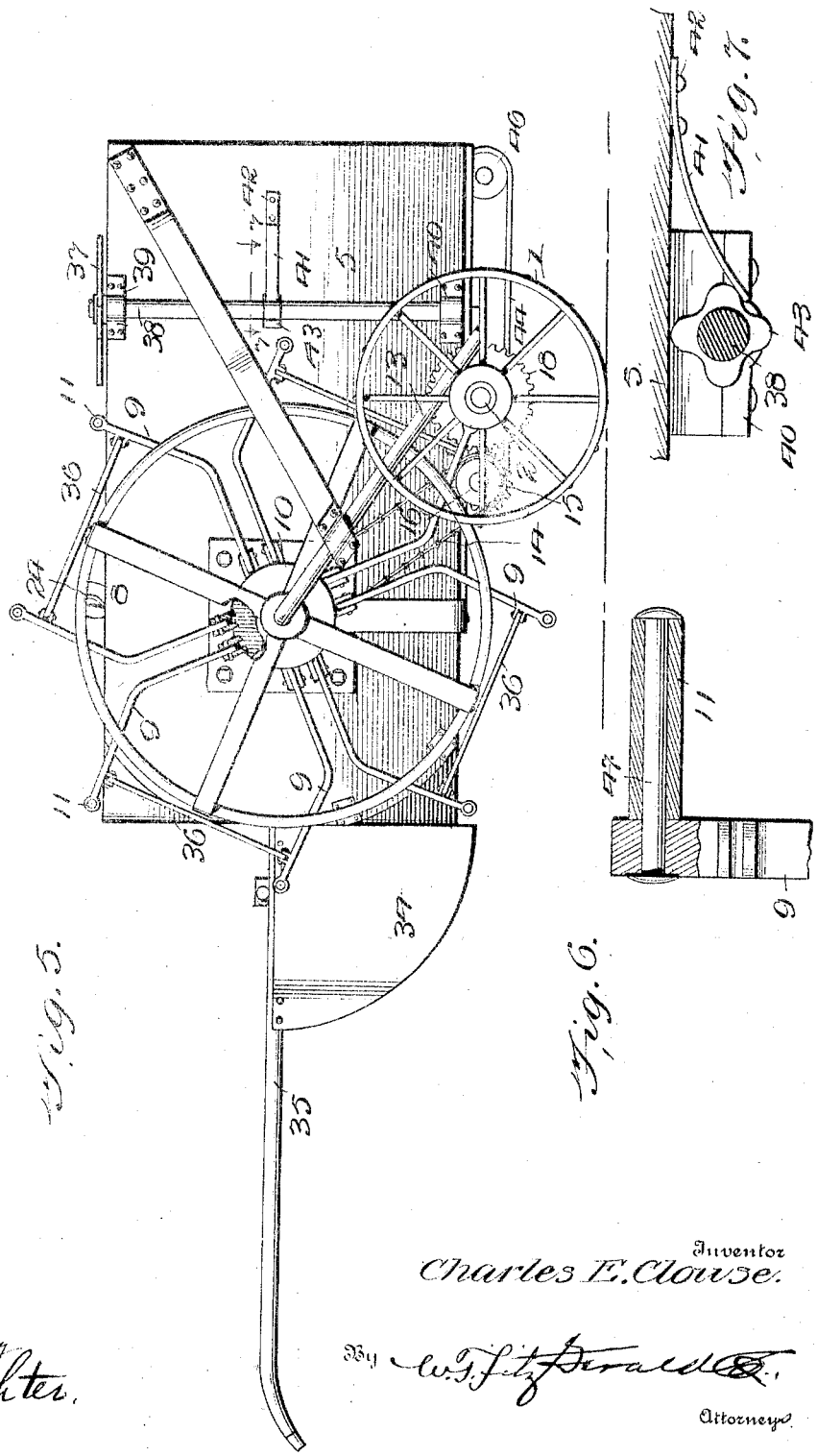

No. 777,078.

Patented December 13, 1904.

UNITED STATES PATENT OFFICE.

CHARLES E. CLOUSE, OF PATASKALA, OHIO.

CORN-HARVESTING MACHINE.

SPECIFICATION forming part of Letters Patent No. 777,078, dated December 13, 1904.

Application filed March 17, 1904. Serial No. 198,608. (No model.)

*To all whom it may concern:*

Be it known that I, CHARLES E. CLOUSE, a citizen of the United States, residing at Pataskala, in the county of Licking and State of Ohio, have invented certain new and useful Improvements in Corn-Harvesting Machines; and I do hereby declare the following to be a full, clear, and exact description of the invention, such as will enable others skilled in the art to which it appertains to make and use the same.

My invention relates to corn-harvesters, and more particularly to that variety designed to enter the field and sever the corn and stalks near the ground and convey the accumulated stalks and blades and the ears of corn adhering thereto to the rear part of the machine, where the same may be bound or secured in bundles or shocks and these deposited upon the ground, so that the same will be left in an upright position ready for being removed from the field at a later period; and my invention consists of certain novel features of combination and construction of parts, the preferred form whereof will be hereinafter clearly presented, and pointed out in the claims.

The main object of my invention, among others, is to provide a machine of the character specified which may be readily drawn over the ground and will take up and gather in the manner specified two rows of corn at each passage of the machine through the field.

Other objects and advantages will be hereinafter made clearly apparent, reference being had to the accompanying drawings, which are made a part of this application, and in which—

Figure 3:
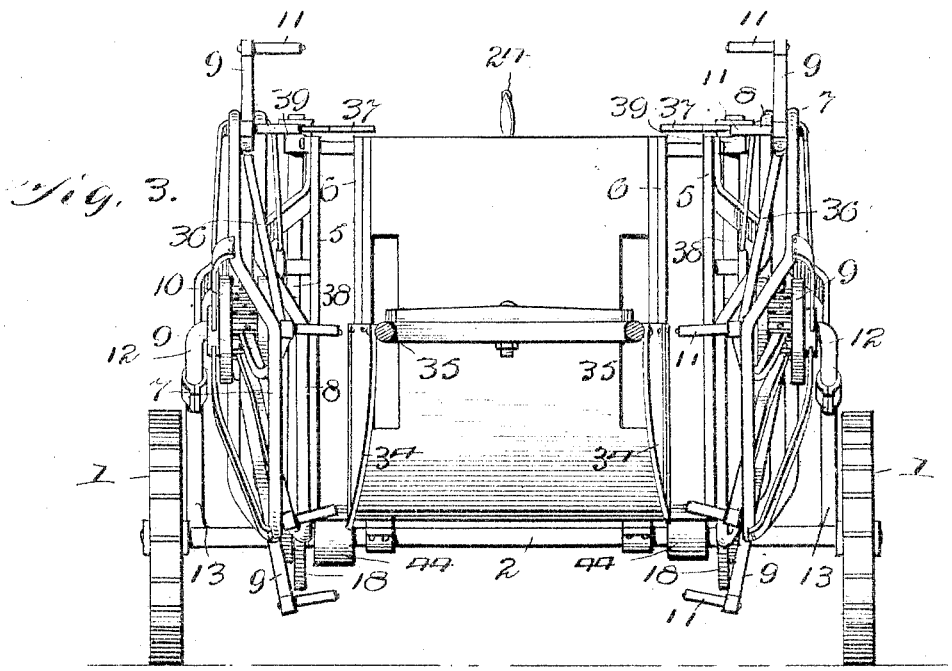
Figure 4:
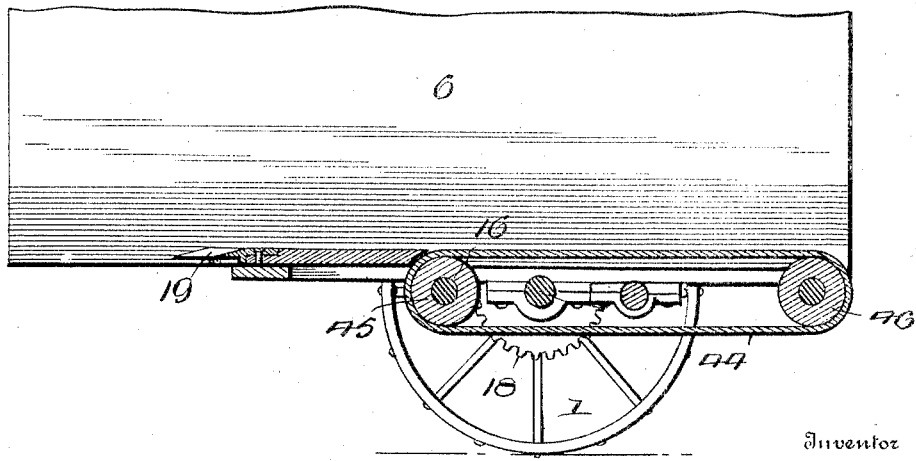

Figure 1 shows a top plan view of my invention complete. Fig. 2 is a central vertical section thereof on line 2 2 of Fig. 1. Fig. 3 is a rear elevation of my machine, showing part thereof in section. Fig. 4 is a sectional view of Fig. 1 on line 4 4. Fig. 5 is a side elevation of my corn-harvesting machine complete. Fig. 6 is a detail view showing the outer end of one of the arms and finger carried thereby, said parts being shown in section. Fig. 7 is a detail view showing a section of part of the mechanism, taken on line 7 7 of Fig. 5.

The various details and coöperating parts of my invention will for convenience be referred to in the description by numerals, the same numeral applying to a corresponding part throughout the drawings.

Referring to the numerals on the drawings, 1 designates the carrying-wheels, of the usual or any preferred construction and size, operatively mounted upon a suitable carrying-frame, as the supporting-axle 2, a suitable tongue or shafts being provided, to which the draft-animals may be attached. Upon the carrying-axle thus or otherwise constructed I locate the platform 4, and upon each edge of said platform I erect a pair of parallel side walls 5 and 6, the latter numeral referring to the two inner walls. It will thus be seen that between the inner walls 6 is an open space, in the forward end of which the driver's seat is mounted and certain controlling devices, as will be hereinafter particularly pointed out, while upon the rear portion of of said platform an attendant will stand ready to tie and shock the bundles of fodder, if deemed necessary.

Upon the outer side of each of the side walls 5 I locate the guideway, which is eccentric or tortuous in character, said guideway consisting of two parallel guiding-bars 7 and 8. The two guideways comprising the members 7 and 8 are circular in form, and designed to be controlled or guided thereby is a plurality of gathering-arms 9, which, as will be seen by reference to Fig. 5, radiate from a common center or hub-section 10, as the spokes of a wheel, the outer end of each gathering-arm 9 being provided with an inwardly-directed finger 11, said finger being for the purpose of successively engaging the stalks of corn, especially when they are in a slanting or fallen condition.

The hub member 10 is rotatably mounted upon and supported by a stub-shaft 12 upon the forward end of the bracing-rod or frame-section 13, said hub being driven by means of a sprocket-chain 14, disposed in engagement with the driving-sprocket 15, the latter being located upon the end of the shaft 16.

Alongside of the sprocket-wheel 15 I secure to the shaft 16 the gear 17, which is placed in mesh with the driving-gear 18 upon the carrying-axle 2. It therefore follows that the sprocket-chain 14 will be so actuated as to rotate the hub 10 rearwardly, causing the arms 9 when in their lowest position to move toward the cornstalks and lift any of the stalks from a fallen position and straighten the same, whereby each of the stalks will be severed by the knife 19, carried by a contiguous part of the framework, it being understood that the floor-section or platform 4 is cut away between the walls 5 and 6 in advance of said knife, but remaining solid and undisturbed rearwardly to said knives, whereby the stalks of corn as severed will find a resting-place upon the remaining portion of the platform.

The guideway comprising the members 7 and 8, it will be observed, is so formed that the arms 9, being yieldingly secured to the hub member 10 or possessing a proper degree of resiliency, will have their outer ends controlled by said trackway, so that the fingers 11 will at their lowest point be moved to a position in advance of the knife ready to engage the row of cornstalks, whether in an inclined or standing position, and lift said stalks upward ready to be brought into engagement with said knife. By reference to Fig. 3 it will be observed that the guideway comprising said members 7 and 8 is disposed nearer the center of the machine on its lower side, the upper part being bent or located farther outward, this curved or tortuous formation of the guideway being designed to move the arms 9 inward at the proper point for coöperation with the standing row of stalks and again move the same outward wholly out of engagement with the upper ends of the stalks after the same have been severed from the ground and disposed between the parallel walls 5 and 6. As the machine is driven over the ground the stalks are successively severed, and as they accumulate between the side walls 5 and 6 they are moved backward to a point where the operator can tie the same into bundles of proper size, so that said bundles may be dropped off of the rear end of the machine to be gathered together into shocks, as is common.

It will be understood that the platform 4 may be extended and increased in length, if deemed desirable.

In order to adjust the position of the cutting-knives 19 so that the stalks will be severed at a proper distance from the ground, I have provided suitable means for attaining any desired adjustment, said means in this instance consisting in connecting to the forward end of the platform or floor-section 4 a suitable bracket 20, having pivoted thereto the link member 21, which is placed in pivotal connection with the controlling-arm 22, which latter is pivotally connected to the lower end of the controlling-lever 23. Said controlling-lever is provided with the usual thumb-latch 24, placed in coöperation with the detent 25 by means of the rod or link member 26, and it therefore follows that said controlling-lever may be readily secured at any desired point by causing the detent 25 to engage one of the ratchets or teeth upon the segmental rack 27, formed upon the standard 28, the latter being bolted to the floor or platform. Between the ends of the link members 21 and 22 I pivotally connect the auxiliary link member 29, the forward end of which is pivoted to the depending bracket 30 upon the lower side of the cross-bar 31, the ends of said cross-bar being provided with extensions 32, which take into suitable apertures or bearing-seats 33, provided in a contiguous part of the frame, it being understood that the shafts or tongue of the machine is also connected to said cross-bar, and it therefore follows that by a proper adjustment of the controlling-lever 23 the forward end of the platform may be depressed or elevated, as desired, so as to bring the cutting-knives into the desired position. Suitable depending shield-sections 34 are secured to the inner ends of the shaft 35 and are adapted to assist in guiding the stalks into the path of the cutting-knives.

The outer ends of the arms 9 are properly reinforced and connected with each other, preferably in pairs, as by the connecting-rod 36, the ends of the rod 36 being preferably pivotally connected to the arms in order to permit them to freely conform to the change of position incident to moving around in the guideway.

I have also provided for each side of the machine a plurality of arms 37, rotatably mounted upon the vertical shaft 38, which latter finds suitable bearings 39 and 40, the office of said arms being to divide the accumulated stalks into bunches of proper size, the operation of the arms being substantially as follows—that is to say, as the quantity of severed stalks accumulates in advance of the arms the force thereof will overcome the tension of the spring 41, held in place by the bracket 42 and so disposed that its free end will successively engage the points upon the friction-wheel 43. When, therefore, the stalks have accumulated to a certain extent, the force or pressure thereof will overcome the tension of the spring 41 and cause the shaft 38 to turn so as to bring the next succeeding arm 37 across the space between the walls 5 and 6, where it will remain until the pressure of the accumulated stalks shall again move said arm rearwardly and incidentally bring the next succeeding arm into position. To facilitate the rear movement and consequent discharge of the accumulated cornstalks, I in some instances remove the floor-section between the side walls 5 and 6 and replace the same by an endless carrier 44, extending said carrier around the carrying-rollers 45 and 46, the roller 45 being disposed upon the shaft 16, above described, whereby said shaft will rotate said roller in a proper way to carry the upper portion of the endless belt or carrier 44 rearwardly.

If preferred, the several gathering-fingers 11 may be mounted or operatively constructed as indicated in Fig. 6, wherein it will be observed that a shaft or spindle 47 is secured in the end of the arm 9, whereby a roller placed upon said spindle will comprise the finger proper and will turn thereon incident to use.

It will thus be seen that I have provided a comparatively simple form of machine whereby fodder or standing and fallen stalks of corn may be reliably gathered and placed in bunches of suitable size, and while I have described the preferred combination and construction of parts deemed necessary in carrying out my invention I wish to comprehend all such substantial equivalents and substitutes as may be considered as falling fairly within the scope of my invention.

It is thought that the construction and manner of using my improved fodder-harvesting machine have thus been made clearly apparent from the foregoing specification, considered in connection with the accompanying drawings, though it may be stated that the operation thereof is as follows: The machine is drawn over the ground in the usual manner, so that two rows of standing or fallen cornstalks will be received between the forward ends of the side walls 5 and 6 and directed into the path of the cutting-blade 19, and it will be understood that the arms and fingers carried thereby will so act upon the cornstalks that any of them occupying an inclined or fallen position will be straightened up, and thereby insure that they will be disposed in a straight condition within the accumulated bundle. The stalks will thus be successively severed by the knives, and the pressure of the accumulated number of stalks will finally be sufficient to turn the arm 37 out of the path thereof and bring the next succeeding arm in place, it being understood that the accumulated bundle may be properly tied by an attendant standing upon the rear end of the platform and finally dropped off at the rear end of the machine or bunched together in the form of a shock, if preferred.

Having thus fully described the construction and manner of using my invention, further reference to the details is deemed unnecessary.

What I claim as new, and desire to secure by Letters Patent, is—

1. In a fodder-gathering machine the combination with a carrying-frame and supporting-wheels therefor, of a platform mounted on said frame, parallel side walls on each side of said platform, a frame 13 and hub members carried by said frame 13, a plurality of gathering-arms pivotally secured to said hubs the outer ends of which are provided with inwardly-directed fingers, circular guiding members 7 and 8 between which said fingers are adapted to travel, said guiding members being so bent as to direct the inwardly-directed fingers into or out of the path of the row of fodder as desired and means to rotate said hubs and arms, substantially as set forth.

2. In a fodder-gathering machine the combination with a carrying-frame and wheels therefor, of a platform mounted on said frame, parallel side walls for each side of said platform, a cutting device for each side of the machine and means to elevate or lower the platform and cutting-knives, comprising a bracket 20 secured to the platform 4, a link member 21 pivotally secured to the bracket 20, a controlling-arm 22 pivotally connected to said link member 21, a controlling-lever 23 to the lower end of which is secured one end of the arm 22, a standard 28 to which is pivotally secured the controlling-lever 23, shafts 35 pivotally secured to the parallel walls 6, a depending bracket 30 secured to the cross-bar of said shafts and a link member 29 pivotally uniting said depending bracket and the meeting ends of the link 21 and controlling-bar 22, whereby when the lever 23 is moved the platform 4 and knives carried thereby will be raised or lowered, substantially as set forth.

In testimony whereof I have signed my name to this specification in the presence of two subscribing witnesses.

CHARLES E. CLOUSE.

Witnesses:
GEORGE D. ULRY,
ELMER DAGUE.